June 22, 1937.  A. W. KEEN  2,084,811
METHOD OF MAKING GLASS NOZZLE
Filed Jan. 10, 1936
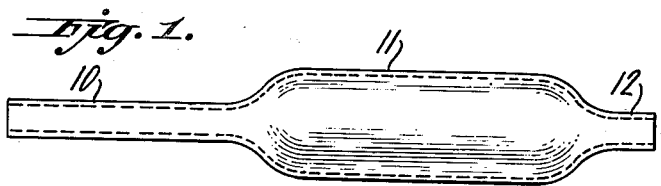
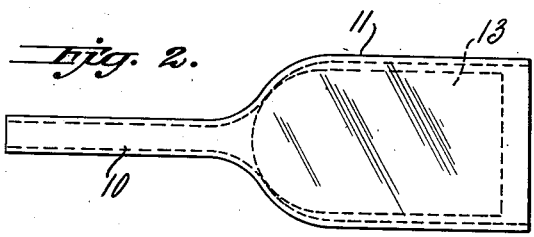
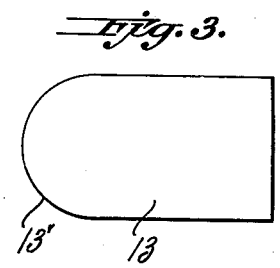
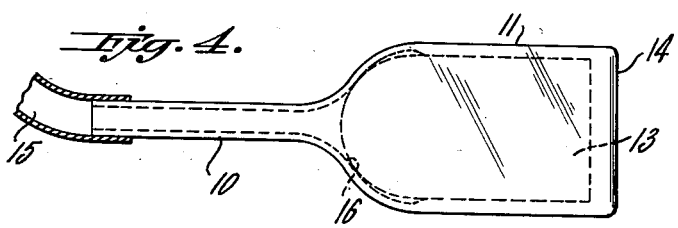
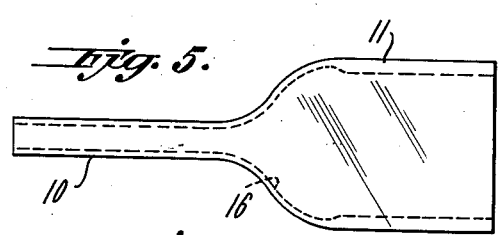
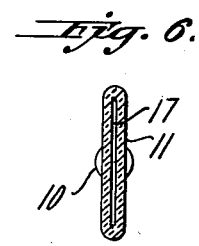
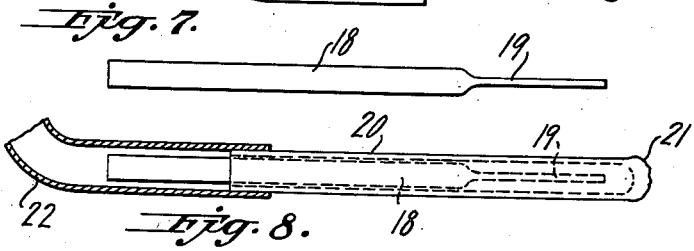
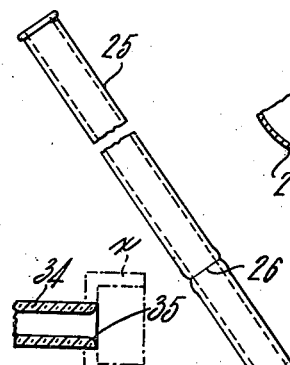
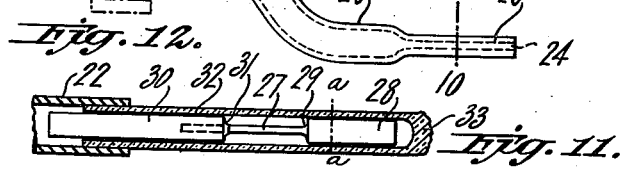
INVENTOR.
ALEXIS W. KEEN
BY
ATTORNEY.

Patented June 22, 1937

2,084,811

UNITED STATES PATENT OFFICE 2,084,811

METHOD OF MAKING GLASS NOZZLES

Alexis W. Keen, Passaic, N. J., assignor to United States Rubber Products, Inc., New York, N. Y., a corporation of Delaware Application January 10, 1936, Serial No. 58,482

8 Claims. (Cl. 49—84)

This invention relates to a method of imparting various shapes to the bores and orifices of glass nozzles with a high degree of dimensional accuracy, to thereby control the shape of a thread or strip to be extruded from the nozzle, and the invention also resides in the nozzle.

It has been proposed heretofore to make rubber threads and strips by extruding an aqueous dispersion of rubber such as latex through a nozzle into a coagulant bath, as described and claimed in the patent to Hopkinson and Gibbons No. 1,545,257 granted July 7, 1925.

It has also been pointed out heretofore that an extruded rubber thread may be made square or rectangular in cross section or may have other shapes imparted thereto by employing an extrusion nozzle, the orifice of which has been given the proper shape in cross section, as disclosed in the patent to Hazell No. 1,902,953, granted March 19, 1933.

However, it has been impossible heretofore to impart the desired non-circular shape to the bore and orifice of a glass nozzle with the required extreme and reproducible accuracy in dimensions.

The present invention contemplates a method whereby any desired shape may be easily, quickly and accurately imparted to the bore and orifice of a glass nozzle, and in order to carry out this method an insert or drift is required having the exact shape and cross-sectional dimensions that are to be imparted to the bore of the glass tube. The insert may be square, round, triangular, rectangular or of any other desired shape in cross section, and a corresponding shape may be imparted to the bore of the tube, in accordance with the present invention, by placing the insert in a glass tube having a suitable size and shape to receive the insert loosely, sealing the tube at one end, and then progressively heating that portion of the tube surrounding the insert to a temperature at which the glass becomes soft but does not fuse, while exhausting air from the tube whereby the pressure of the atmosphere causes the softened glass to collapse about or against the insert and assume interiorly the exact shape thereof.

In this manner the glass tube is accurately molded around the insert. The insert may then be removed, leaving a nozzle the bore and orifice of which correspond accurately to the shape of the insert. By this invention nozzles of a desired shape and size of bore are reproducible with an accuracy of 0.0001 to 0.0002 inch.

The invention further contemplates the coating of the insert with a thin layer of smoke particles to act as a lubricant and cushion between the glass and insert.

The present method will be more fully understood from the following description when read in connection with the accompanying drawing illustrating steps in carrying out the invention.

Figure 1 is a side view of a glass tube having an enlarged intermediate portion;

Figure 2 is a similar view showing the tube after one end portion has been removed and the enlarged portion has been flattened to receive a flat insert;

Figure 3 is a side view of a flat insert;

Figure 4 shows the insert sealed within the tube;

Figure 5 shows the finished nozzle tip after the insert has been removed and the sealed end cut off;

Figure 6 is an end view of the tube of Fig. 5;

Figure 7 is a side view of a drift or different type of insert;

Figure 8 is a side view of a glass tube with the drift of Fig. 7 inserted therein and the end of the tube sealed;

Figure 9 is a side view of a complete nozzle consisting of a nozzle tip formed from the tube of Fig. 8 which is secured to an extension tube;

Figure 10 is an enlarged sectional view taken on the line 10—10 of Figure 9;

Figure 11 is a longitudinal sectional view through a glass tube having a modified type of drift sealed therein; and Figure 12 on a larger scale is a sectional view through the discharge end of a nozzle formed in accordance with the disclosure of Figure 11.

If it is desired to provide a wide, flat nozzle tip in accordance with the present invention, a short length 10 of glass tubing, preferably of Pyrex glass is employed, and the tube is preferably enlarged near one end as at 11 in Fig. 1 by heating and blowing the glass in a well known manner, after which the end portion 12 may be cut off. The enlarged portion 11 may then be flattened out as shown in Fig. 2 sufficiently to receive the insert 13 of Fig. 3. This is readily accomplished by heating the portion 11 and applying pressure to the opposite sides thereof.

The insert 13 may have any desired size and shape and is shown as a flat plate which may be readily formed by cutting the same from a piece of hard sheet copper and rounding one end as at 13'. The sides and edges of the insert are then preferably smoothed off with an oil stone. Before the insert 13 is placed in the enlarged portion 11 of the tube it should be smoked in the flame of a candle to deposit a thin carbon coating thereupon which will serve as a lubricant to the glass while cooling and prevent cracking.

After the insert 13 has been inserted in the portion 11, the end through which the insert was introduced may be sealed by melting the glass at this end as at 14. The configuration of the insert 13 may then be imparted to the interior of the portion 11 by exhausting air from this tube by any suitable means such as a flexible tube 15 connected to vacuum producing mechanism, not shown, and while the air pressure is reduced within the tube about the insert 13 heat of a blow flame is applied gently to the enlarged portion 11 starting from the sealed end and advancing only after the glass has formed tightly about the insert and no air bubbles remain. This heating and softening of the glass about the insert is continued to a point near the round end 13'. The heat is applied so as to soften the glass sufficiently to cause it to be molded snugly about the insert by the atmospheric pressure. The glass should then be cooled slowly in the flame to prevent cracking.

After this operation of molding the portion 11 of the tube snugly about the insert 13 is finished, the insert may be removed from the tube by placing the nozzle tip 10, 11 in nitric or other acid for a sufficient period to eat away the copper. The tube may then be washed after which the sealed end is cut off the desired distance from the rounded shoulders 16 formed in the tube, and the cut end preferably is fire polished. This completes the nozzle tip which may have the appearance shown in Fig. 5 in side view and the accurately shaped orifice 17 shown in end view in Fig. 6.

Should it be desired to form a nozzle tip having an orifice smaller in size than the opening in the glass tube employed, then it is unnecessary to form the tube with an enlarged portion as in Fig. 1, but the somewhat different method which will now be described in connection with Figures 7 to 10 inclusive may be employed.

In following this modified method, the drift of Fig. 7 may be employed. This drift has a shank 18 and reduced insert 19 that is accurately ground to the shape and size it is desired to impart to the bore and orifice of the nozzle. The insert 19 may taper very slightly towards its outer end to facilitate its withdrawal from the molded tube. A piece of Pyrex glass tubing 20 of a length less than the length of the drift is preferably employed and one end of this tube is sealed as at 21. The ground portion 19 of the drift may then be smoked as above described and the drift inserted in the tube 20 so that a portion of the shank projects from the tube as shown in Fig. 8. A piece of flexible tubing 22 may then be placed over the end of the tube 20 to exhaust air therefrom. Then while the air pressure is reduced in the tube 20 heat is applied to this tube around the insert 19 as above described to cause this portion of the tube to collapse and be forced into snug engagement with the insert 19 by the external atmospheric pressure.

The projecting end of the drift shank 18 may be engaged to withdraw the drift from the tube 20, and either before or after the withdrawal of the drift the closed end of the tube may be cut off at the desired point along the reduced portion 23 of the tube, and the cut end preferably is fire polished. This completes the work of forming the nozzle tip 20 having the accurately shaped orifice 24 of Fig. 10, but if desired the tip may be bent as shown in Fig. 9 and secured to an extension tube 25 by a butt joint 26.

It may be desirable to form the glass nozzle with an accurately rounded edge at its discharge end. This may be accomplished by employing the modified type of drift shown in Fig. 11, wherein the drift comprised the reduced portion 27 having the size and cross-sectional shape to be imparted to the bore of the nozzle, and at one end of this reduced portion is provided the enlarged portion 28. An accurately formed rounded shoulder 29 is provided at the point where the portions 27 and 28 meet. The shank 30 is preferably formed with a central hole adapted to receive the outer end of the portion 27 of the drift as shown, and this shank is likewise provided with a rounded shoulder 31 adapted to properly shape the bore of the tube at the entrance to the reduced orifice.

The drift of Fig. 11 may be sealed in a glass tube 32 by closing the end 33 of the tube as in Fig. 8 whereupon air may be exhausted from the tube through a flexible pipe 22 and the tube is heated to cause the glass to collapse about the drift under the atmospheric pressure as above described. The drift may then be removed from the shaped tube by cutting this tube off, say at the dotted line $a$. The parts 27 and 28 may then be withdrawn from the tube 32 in the right hand direction and the shank 30 may be withdrawn in the left hand direction. This completes the forming of the nozzle tip 34 having the accurately rounded edge 35. The excess glass $x$ may then be removed by grinding to provide the nozzle end shown in section in Fig. 12; or an extension of the tube wall beyond the orifice may be left intact to serve as a shield for the orifice against damage in subsequent handling and use.

The insert portion 19 of the drift may be given any desired shape and in the present case the cross section is quadrilateral with concave sides and cusped corners as will be apparent from the corresponding shaped orifice 24 imparted to the tube. This nozzle may be used to produce an extruded rubber thread that is square in cross section. The side walls of the orifice are given the inwardly curved shape shown to correct the tendency of the extruded thread to assume a round shape, as more fully disclosed in the Hazell patent above cited.

In carrying out the method of the invention, the exhausting of the air from the tube containing the insert serves the triple functions of collapsing the softened tube about the insert, of preventing the trapping of air bubbles between the insert and the tube, and of preventing access of air to the insert during the heating whereby the formation of an oxide film on the metallic insert is avoided. The smoking of the insert before its insertion in the tube provides a lubricant carbon film and also provides a reducing environment for preventing surface oxidation of the insert by any residual air in the exhausted tube.

The extrusion nozzles of the present invention are well adapted for use in extruding latex to form latex threads or strips but may be employed to extrude various other plastic materials.

Having thus described my invention what I claim and desire to protect by Letters Patent is:

1. The method of imparting to a glass nozzle a predetermined shape, which consists in inserting in a glass tube a drift having the shape to be imparted to the orifice of the nozzle, closing an end of the tube, heating the tube about the drift sufficiently to soften the glass thereabout and exhausting air from the tube through its other end while the tube is softened by the heat to cause the atmospheric pressure to mold the soft glass snugly about the drift.

2. The method of imparting to a nozzle a predetermined shape, which consists in placing in a tube an insert having the shape to be imparted to the orifice of the nozzle, heating the tube about the insert to soften the walls of the tube and exhausting air from the tube while it is softened by the heat to cause the atmospheric pressure to mold the soft walls of the tube snugly about the insert.

3. The method of making a glass nozzle of a predetermined shape, which consists in placing in a glass tube an insert having the shape to be imparted to the orifice of the nozzle, heating the tube to soften the glass around the insert and exhausting air from the tube while it is softened by the heat to cause the atmospheric pressure to mold the walls of the tube snugly about the insert, and removing the insert from the tube.

4. The method of making a glass nozzle of a predetermined shape, which consists in placing in a glass tube a metal insert having the shape to be imparted to the orifice of the nozzle, heating the tube to soften the glass around the insert and exhausting air from the tube while it is softened by the heat to cause the atmospheric pressure to mold the walls of the tube snugly about the insert, then placing the tube in acid to eat the insert away.

5. The method of making a glass nozzle of a predetermined shape, which consists in placing in a glass tube an insert, sealing the end of the tube adjacent the insert, heating the tube to soften the glass around the insert and exhausting air from the tube while it is softened by the heat to cause the atmospheric pressure to mold the walls of the tube about the insert, then removing the insert and cutting off the tube near its sealed end.

6. The method of making a glass nozzle having a slot-shaped orifice, which consists in enlarging a portion of a glass tube and pressing it relatively flat, inserting in this flattened portion of the tube a relatively flat insert, sealing the insert therein, heating the tube to soften the glass around the insert and exhausting air from the tube to cause the atmospheric pressure to mold the walls of the tube about the insert, then removing the insert and the sealed end portion of the tube.

7. The method of making a glass nozzle having a slot-shaped orifice, which consists in enlarging a portion of a glass tube and pressing it relatively flat, inserting in this flattened portion of the tube a relatively flat metal insert, sealing the insert therein, heating the tube to soften the glass around the insert and exhausting air from the tube to cause the atmospheric pressure to mold the walls of the tube about the insert, placing the tube in an acid to eat the insert away, and cutting off the tube near its sealed end.

8. The method of making a glass nozzle of a predetermined shape, which consists in providing an insert having the shape to be imparted to the orifice of the nozzle, exposing the insert to smoke to deposit thereupon a thin coating of carbon particles, placing the insert in a glass tube, heating the tube to soften the glass around the insert and exhausting air from the tube to cause the atmospheric pressure to mold the walls of the tube snugly about the insert, and removing the insert from the tube.

ALEXIS W. KEEN.